UNITED STATES PATENT OFFICE.

FRANÇOIS SCHMALZ, OF NEW YORK, N. Y., ASSIGNOR, BY DIRECT AND MESNE ASSIGNMENTS, TO THE PHOTO-LITHO TRANSFER COMPANY, OF SAME PLACE.

PROCESS OF ORNAMENTATION.

SPECIFICATION forming part of Letters Patent No. 493,450, dated March 14, 1893.

Application filed May 5, 1892. Serial No. 431,945. (No specimens.)

*To all whom it may concern:*

Be it known that I, FRANÇOIS SCHMALZ, a citizen of the United States, and a resident of the city and county of New York, in the State of New York, have invented a certain new and Improved Process of Ornamentation, of which the following is a specification, such as will enable others skilled in the art to which it appertains to make and use the same.

My invention relates to a process of ornamenting of wood, glass, crockery, and flexible fabrics with designs not soluble in nor affected by hot or cold water, which process will be hereinafter fully described, and particularly pointed out in the claim.

The object of my invention is to provide a process of ornamentation which shall be simple and easily carried out, which shall be cheap, and by which large and small surfaces of glass, wood, metal, flexible fabrics, and almost any material may be successfully and satisfactorily ornamented with any desired design, in such manner that the article may be cleansed in hot water without fear of injury to the ornamentation, and which will not be injured by differences in temperature, or other ordinary usage.

To this end my invention consists in forming on a suitable backing a film, soluble in water, printing or delineating on said film the figure, representation or object constituting the design, and covering said design with an elastic film, readily adapting itself to the swelling or shrinking of wood, and to the bending or folding of fabrics, and not soluble in nor affected by hot or cold water, cementing said design onto the article to be ornamented, saturating the backing, thus dissolving the soluble film, and then removing the backing.

To carry out my invention, a suitable backing, preferably of some porous material such as paper, is first prepared to receive the design by being covered or washed upon one side with a solution of some varnish-like substance which is soluble in water, preferably dextrin, so as to form a smooth coating of such water varnish on one side of such backing. This soluble coating or film having been allowed to become thoroughly dry, the desired design is then printed or otherwise formed, in any desired manner, thereon. The design so formed having become thoroughly dry, the same, and also preferably the entire surface of the soluble coating or film, is covered or washed with a solution of rubber, thus forming a rubber film over the design. This rubber solution is produced by subjecting pure india rubber divided into small pieces, to the action of benzine, until the rubber is thoroughly dissolved; and I have found by experiment that a solution of rubber and benzine in about the proportion by weight of one hundred parts of benzine to four parts of rubber is the best mixture for forming such films. Although this film of rubber may be formed over the design in any convenient way, I prefer to form the same thereover by flowing the soluble, coated side of the backing on which is formed the design with the liquid solution, in the same manner as in the flowing of photographic plates with collodion, draining off the surplus, and then allowing the film adhering to and covering the design and soluble film to dry thereon.

When it is desired to ornament any article with such design, that portion of the article to be ornamented with the design is coated with a cement to which the elastic or rubber covering film will readily adhere, and which will harden and cement such film firmly to the article. For this purpose I use a solution of gelatine and chrome alum dissolved in hot water, of about the proportion by weight of one hundred parts of water, twenty parts of gelatine, and two parts of chrome alum. This solution, or liquid cement, having been spread upon the article as stated, before the same has time to coagulate, the rubber filmed side of the design is placed thereon, and the backing smoothly rubbed down over the same, so as to cause such rubber film to stick to the cement at all points. After the cement has had time to harden, the paper backing is saturated with cold water until the dextrin or other soluble film is dissolved, when the backing may be easily removed, and the rubber film carrying the design will be found adhering to the article, and cemented thereto by the coating of gelatine and chrome alum, and as such coating is insoluble in water, even when the same is highly heated, the article so ornamented may be washed and cleansed when desired without fear of injuring the design thereon.

When it is desired to transfer one of the designs to a flexible fabric, the operation is precisely the same, except that the portion of such fabric which is to receive the design is first preferably saturated with some suitable sizing, preferably with the solution of gelatine and chrome alum above mentioned, which is allowed to thoroughly harden before the coating of such gelatine and chrome alum, or other suitable cement, to which the rubber film carrying the design is to be secured, is applied thereto.

Having thus fully described my invention, what I claim as new, and desire to secure by Letters Patent, is—

The herein described process of ornamentation, which consists in providing a sheet of paper or other suitable backing with a soluble coating or film, forming a design upon such soluble film, covering the design with a coating or film of rubber, coating the article to be ornamented with a solution of gelatine and chrome alum, affixing the rubber film to the coating of gelatine and chrome alum, saturating the backing with a liquid which will dissolve the soluble film, and removing the backing, substantially as described.

Signed at the city and county of New York, in the State of New York, this 4th day of May, A. D. 1892.

FRANÇOIS SCHMALZ.

Witnesses:
GEO. E. HERNE,
CLARENCE L. DAVIS.